May 14, 1929.   E. L. DELANY   1,712,605
FLUSH VALVE FLOAT FOR FLUSH TANKS

Filed Sept. 29, 1925

Inventor

E. L. Delany

By C. R. Wright Jr. Attorney

Patented May 14, 1929.

1,712,605

UNITED STATES PATENT OFFICE.

EDWARD L. DELANY, OF BROOKLYN, NEW YORK, ASSIGNOR TO DELANY REALTY CORPORATION, OF BROOKLYN, NEW YORK.

FLUSH-VALVE FLOAT FOR FLUSH TANKS.

Application filed September 29, 1925. Serial No. 59,367.

My invention relates to improvements in flush valve floats for flush tanks.

The object of my invention is to provide a hard rubber flush valve float for flush tanks, or other purposes in which the same is made of hard rubber and provided with a horizontally removable seating portion made of soft rubber, leather or other soft materials, adapted to cooperate with the seat so that a smaller seating surface is required, and at the same time insure of the perfect seating of the valve to prevent the leakage of water therearound.

Another object of my invention is to provide a flush valve float of this character made of two sections threaded together, and in which the soft seating portion of the valve also serves as means for forming a tight connection between the two portions of the flush valve float, so that water can not seep through the connection between the sections and cause the flush valve float to fill with water and sink.

A further object of my invention is to provide means whereby a soft seating portion made of rubber or other materials is provided with a limited movement so as to insure a perfect seating thereof on the seat of the valve.

A still further object of my invention is to provide a simple, cheap and effective flush valve float of this character having certain details of structure and combination of parts hereinafter more fully set forth.

In the accompanying drawings:—

Figure 1:
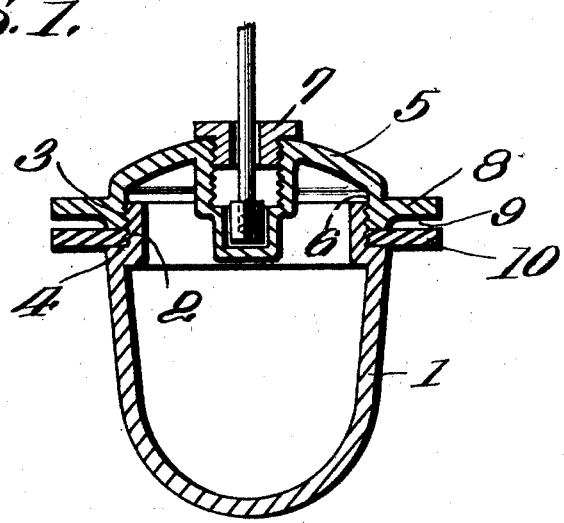
Figure 1 is a vertical sectional view of my improved flush valve float.

Referring now to the drawings, 1 represents the main body portion of my improved flush valve float, which is made of hard rubber and provided at its upper end with a contracted portion 2, externally threaded at 3, and forming a horizontal annular portion 4. The upper, or cap portion 5 of my improved flush valve float is made of hard rubber and is internally threaded as indicated at 6, adapted to screw upon the threaded portion 3, of the body portion 1. The center of the cap portion is provided with means 7 for attaching the operating rod 7' thereto, all of which is fully shown and described in a co-pending application and needs no further description.

The cap 5, opposite the threaded portion 6, is provided with an outwardly extending flange 8, having its lower face adjacent its outer end cut away as indicated at 9. From this construction it will be seen that a soft washer 10, made of rubber or other materials, is placed upon the annular portion 4, and has its outer end arranged in a vertical plane with the outer end of the flange 8. The cap is screwed down upon the threaded portion 3 of the body portion and tightly clamps the soft washer 10 thereon, which forms a tight joint between the cap and the body portion to prevent the water from seeping into the flush valve float.

By this structure it will be seen that the outer end of the washer 10 can have a limited vertical movement, moving upwardly in the space 9, so that the valve will at all times seat itself upon the seat, and thus provide for any irregularity in the seat.

Figure 2:
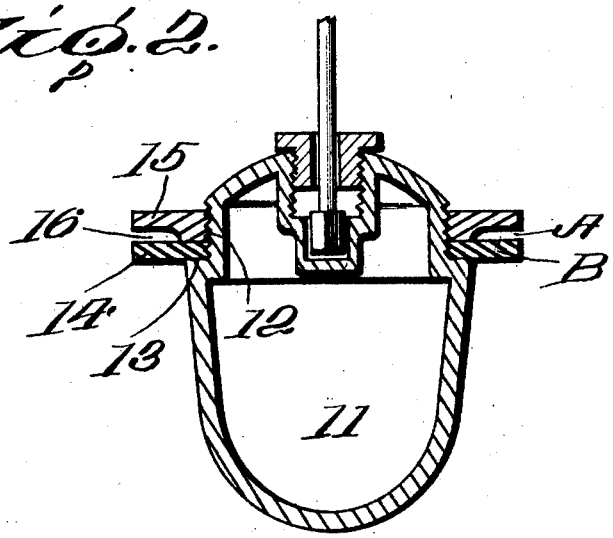
Figure 2 is a vertical sectional view, similar to Figure 1, of a modified form.

In the modification shown in Figure 2, the float valve 11 is made of one piece and provided with a reduced threaded portion 12 providing a horizontal annular portion 13 upon which the soft washer 14 rests, and a hard rubber nut 15 is screwed on the reduced threaded portion 12, and clamps the same on the seat. The nut 15 is cut away as indicated at 16, forming a space so that the soft washer 14 has a limited vertical movement for the same purpose stated in respect to Figure 1.

Having thus fully described my invention what I claim is:—

1. A flush valve float comprising a hollow body portion having an annular flange adjacent its upper end, a soft rubber seating washer surrounding the body portion and resting on the flange and extending beyond the body portion, and a clamping means screwed on the body portion and clamping the soft seating washer on the flange, and having an outwardly extending portion extending over the soft washer and spaced therefrom.

2. A flush valve float comprising a body portion having a reduced externally threaded upper end forming an annular flange, a soft washer surrounding the body portion and resting on the flange, and a cap closing the upper end of the body portion and clamping the soft seating washer to the body portion and forming a tight joint between the body portion and the cap.

3. A flush valve float comprising a hollow hard rubber body portion having a reduced upper end externally threaded and forming an annular horizontal flange, a soft seating washer resting on the flange, and a cap internally threaded and screwed upon the reduced portion of the body portion, and having an annular flange extending out over the soft seating washer, and its lower face cut away, forming a space between the same and the soft seating washer.

4. A flush valve float comprising a body portion having a reduced externally threaded upper end forming an annular flange, a soft washer surrounding the body portion and resting on the flange, and a member screwed on the reduced externally threaded upper end of the body portion and clamping the soft seating washer thereto, and having its outer edge terminating flush with the outer edge of the soft washer.

In testimony whereof, I have signed this specification.

EDWARD L. DELANY.